(12) United States Patent  
Germain et al.

(10) Patent No.: US 6,671,145 B2  
(45) Date of Patent: Dec. 30, 2003

(54) RESET LOCKOUT MECHANISM AND INDEPENDENT TRIP MECHANISM FOR CENTER LATCH CIRCUIT INTERRUPTING DEVICE

(75) Inventors: Frantz Germain, Rosedale, NY (US); Stephen Stewart, Uniondale, NY (US); Roger M. Bradley, North Bellmore, NY (US); David Y. Chan, Bellerose, NY (US); Nichalas L. Disalvo, Levittown, NY (US); William R. Ziegler, East Northport, NY (US)

(73) Assignee: Leviton Manufacturing Co., Inc., Little Neck, NY (US)

(*) Notice: Subject to any disclaimer, the term of this patent is extended or adjusted under 35 U.S.C. 154(b) by 337 days.

(21) Appl. No.: 09/812,624

(22) Filed: Mar. 20, 2001

(65) Prior Publication Data

US 2002/0135958 A1 Sep. 26, 2002

(51) Int. Cl.[7] .......................... H02H 3/16; H01H 83/04
(52) U.S. Cl. ................................... 361/45; 335/24
(58) Field of Search ..................... 361/93.1, 45; 335/21, 335/24, 25

(56) References Cited

U.S. PATENT DOCUMENTS

| 4,002,951 A | * | 1/1977 | Halbeck | 317/18 |
|---|---|---|---|---|
| 4,034,266 A | | 7/1977 | Virani et al. | 361/42 |
| 4,521,824 A | * | 6/1985 | Morris et al. | 361/45 |
| 4,595,894 A | | 6/1986 | Doyle et al. | 335/18 |
| 4,719,437 A | | 1/1988 | Yun | 335/18 |
| 4,802,052 A | | 1/1989 | Brant et al. | 361/42 |
| 4,851,951 A | | 7/1989 | Foster, Jr. | 361/50 |
| 5,223,810 A | | 6/1993 | Van Haaren | 335/18 |
| 5,224,006 A | | 6/1993 | MacKenzie et al. | 361/45 |
| 5,229,730 A | * | 7/1993 | Legatti et al. | 335/18 |
| 5,477,412 A | * | 12/1995 | Neiger et al. | 361/45 |
| 5,517,165 A | * | 5/1996 | Cook | 335/18 |
| 5,594,398 A | | 1/1997 | Marcou et al. | 335/18 |
| 5,600,524 A | | 2/1997 | Neiger et al. | 361/42 |
| 5,661,623 A | * | 8/1997 | McDonald et al. | 361/42 |
| 5,805,397 A | | 9/1998 | MacKenzie | 361/42 |
| 5,956,218 A | * | 9/1999 | Berthold | 361/42 |
| 6,040,967 A | | 3/2000 | DiSalvo | 361/42 |
| 6,246,558 B1 | | 6/2001 | DiSalvo et al. | 361/42 |

* cited by examiner

Primary Examiner—Gregory J. Toatley, Jr.  
Assistant Examiner—Zeev Kitov  
(74) Attorney, Agent, or Firm—Paul J. Sutton

(57) ABSTRACT

Resettable circuit interrupting devices, such as GFCI devices, that include a reset lockout mechanism, an independent trip mechanism and reverse wiring protection. A conical reset plunger is notched to force a successful test before reset.

1 Claim, 17 Drawing Sheets

SWITCH RESETTING

CLOSED SWITCH ABOUT TO OPEN

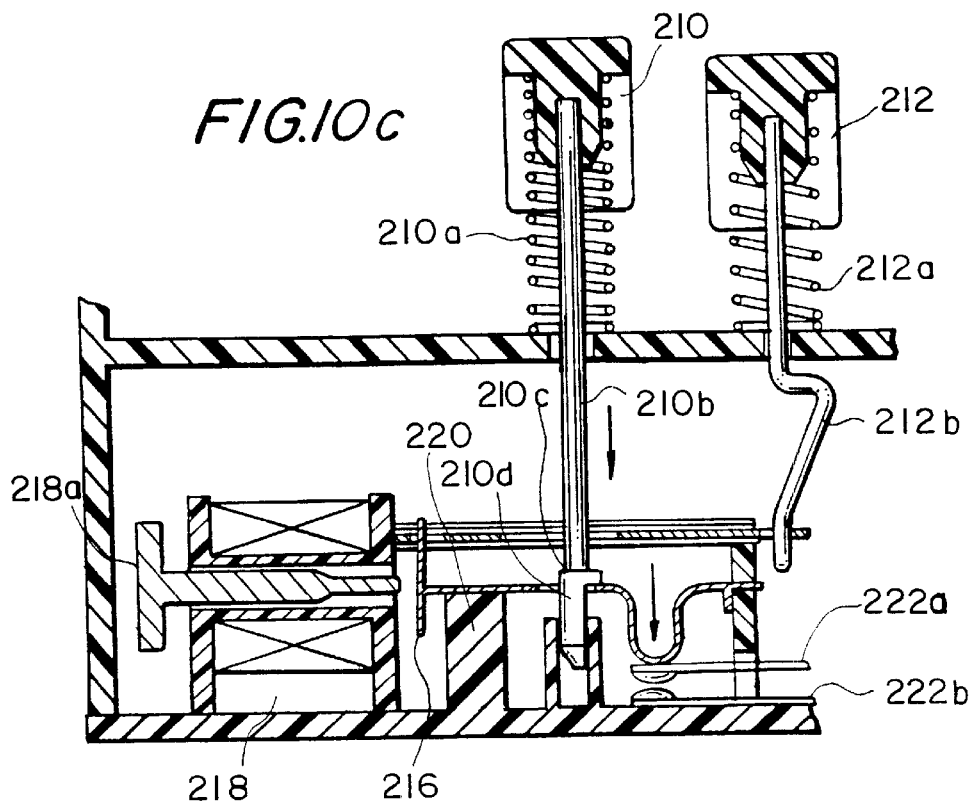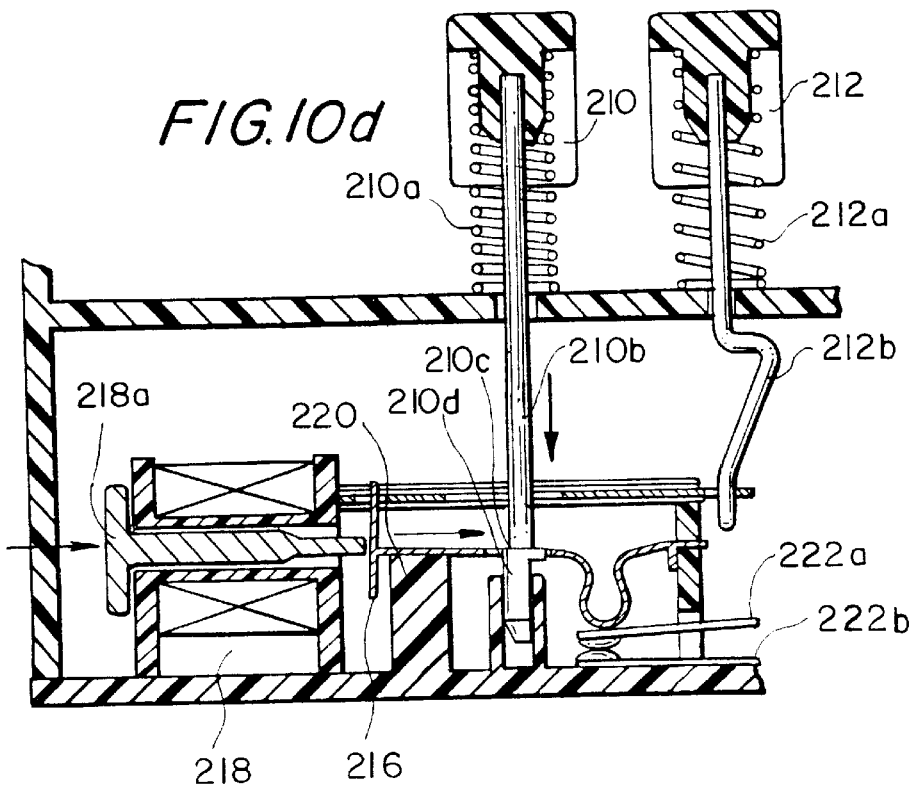

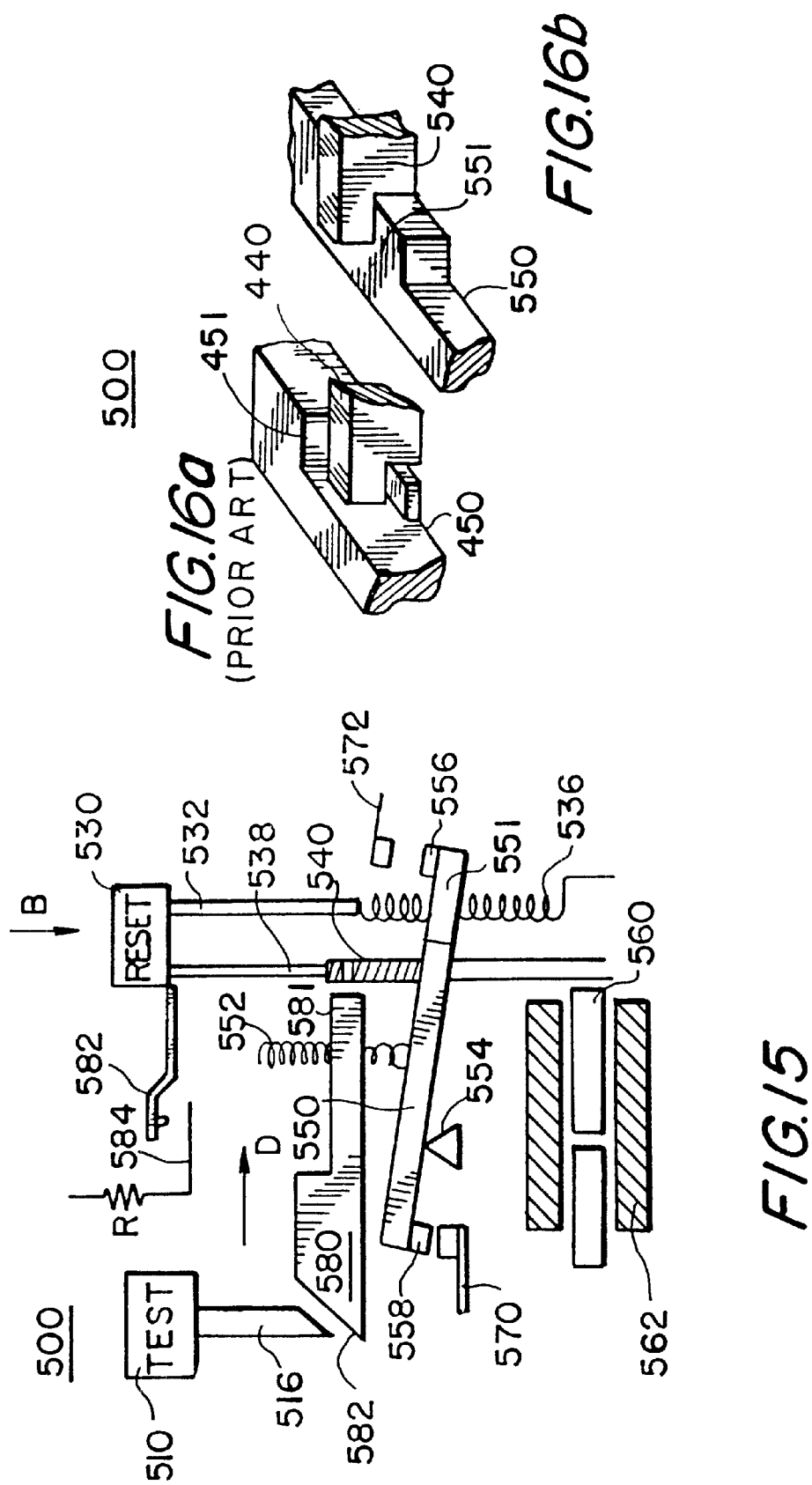

US 6,671,145 B2

RESET LOCKOUT MECHANISM AND INDEPENDENT TRIP MECHANISM FOR CENTER LATCH CIRCUIT INTERRUPTING DEVICE

CROSS REFERENCE TO RELATED APPLICATIONS

This application is a continuation-in part of application Ser. No. 09/812,288 To Be Determined, filed Mar. 20, 2001, entitled Circuit Interrupting Device with Reset Lockout and Reverse Wiring Protection and Method of Manufacture, by inventors Steven Campolo, Nicholas DiSalvo and William R. Ziegler, which is a continuation-in-part of application Ser. No. 09/379,138 filed Aug. 20, 1999, which is a continuation-in-part of application Ser. No. 09/369,759 filed Aug. 6, 1999, which is a continuation-in-part of application Ser. No. 09/138,955, filed Aug. 24, 1998, now U.S. Pat. No. 6,040,967, all of which are incorporated herein in their entirety by reference.

This application is related to commonly owned application Ser. No. 09/812,875 To Be Determined, filed Mar. 20, 2001, entitled Reset Lockout for Sliding Latch GFCI, by inventors Frantz Germain, Stephen Stewart, David Herzfeld, Steven Campolo, Nicholas DiSalvo and William R. Ziegler, which is a continuation-in-part of application Ser. No. 09/688,481 filed Oct. 16, 2000, all of which are incorporated herein in their entirety by reference.

This application is related to commonly owned application Ser. No. 09/379,140 filed Aug. 20, 1999, which is a continuation-in-part of application Ser. No. 09/369,759 filed Aug. 6, 1999, which is a continuation-in-part of application Ser. No. 09/138,955, filed Aug. 24, 1998, now U.S. Pat. No. 6,040,967, all of which are incorporated herein in their entirety by reference.

BACKGROUND

1. Field

The present application is directed to resettable circuit interrupting devices including without limitation ground fault circuit interrupters (GFCI's), arc fault circuit interrupters (AFCI's), immersion detection circuit interrupters (IDCI's), appliance leakage circuit interrupters (ALCI's), equipment leakage circuit interrupters (ELCI's), circuit breakers, contactors, latching relays and solenoid mechanisms. More particularly, the present application is directed to circuit interrupting devices that include a circuit interrupting portion that can isolate a power source connector from a load connector.

2. Description of the Related Art

Many electrical wiring devices have a line side, which is connectable to a source of electrical power, and at least one load side, which is connectable to one or more loads and at least one conductive path between the line and load sides. There are circuit breaking devices or systems such as Ground Fault Circuit Interrupters (GFCIs) which are designed to interrupt power to various loads, such as household appliances, consumer electrical products and branch circuits. GFCI devices, such as the device described in commonly owned U.S. Pat. No. 4,595,894, use an electrically activated trip mechanism to mechanically break an electrical connection between the line side and the load side. Such devices are resettable after they are tripped by, for example, the detection of a ground fault. In the device discussed in the '894 patent, the trip mechanism used to cause the mechanical breaking of the circuit (i.e., the conductive path between the line and load sides) includes a solenoid (or trip coil). A test button is used to test the trip mechanism and circuitry used to sense faults, and a reset button is used to reset the electrical connection between line and load sides.

However, instances may arise in which an abnormal occurrence, such as a lightning strike, may disable the trip mechanism used to break the circuit. Accordingly, a user may find a GFCI in a tripped state and not be aware that the internal trip mechanism is not functioning properly. The user may then press the reset button, which will cause the device with an inoperative trip mechanism to be reset. The GFCI will be in a dangerous condition because it will then provide power to a load without ground fault protection.

Further, an open neutral condition or reverse wiring condition may be present. Such conditions may be dangerous and it may be advantageous for a GFCI to disable a reset function if such conditions or other conditions exist.

The applications referenced above as related applications are commonly owned and incorporated herein by reference. The applications generally relate to locking out a reset function or otherwise disabling a circuit interrupting device on the occurrence of a condition.

U.S. Pat. No. 5,933,063 to Keung, et al., purports to describe a GFCI device and apparently utilizes a single center latch. U.S. Pat. No. 5,933,063 is hereby in its entirety be reference. U.S. Pat. No. 5,594,398 to Marcou, et al., purports to describe a GFCI device and apparently utilizes a center latch. U.S. Pat. No. 5,594,398 is hereby in its entirety be reference. U.S. Pat. No. 5,510,760 to Marcou, et al., purports to describe a GFCI device and apparently utilizes a center latch. U.S. Pat. No. 5,594,398 is hereby in its entirety be reference. A typical GFCI design that may benefit from a modification according to the present invention has been marketed under the designation Pass & Seymour Catalog No. 1591.

Another GFCI design that may benefit from a modification according to the present invention has been marketed under the designation Bryant Catalog Number GFR52FTW.

SUMMARY

The present application relates to a resettable circuit interrupting devices that lockout the reset function under certain conditions. In one embodiment, a test mechanism is utilized to test the circuit interrupter before allowing a reset. In an embodiment, a reset plunger is modified to exert force on a trip latch in order to close a test circuit that will allow the reset plunger to continue to a reset position only if the circuit interrupter is functioning.

BRIEF DESCRIPTION OF THE DRAWINGS

Preferred embodiments of the present application are described herein with reference to the drawings in which similar elements are given similar reference characters, wherein:

FIGS. 10a–f is a sectional side view of the mechanism of a portion of the GFCI of FIG. 8;

FIG. 15 is a cutaway representation of part of a GFCI according to an embodiment of the present invention and relates to FIGS. 14a–c; and FIGS. 16a–b is a cutaway representation of part of a GFCI according to an embodiment of the present invention and relates to FIGS. 14a–c.

DETAILED DESCRIPTION OF EMBODIMENTS

Figure 1A:
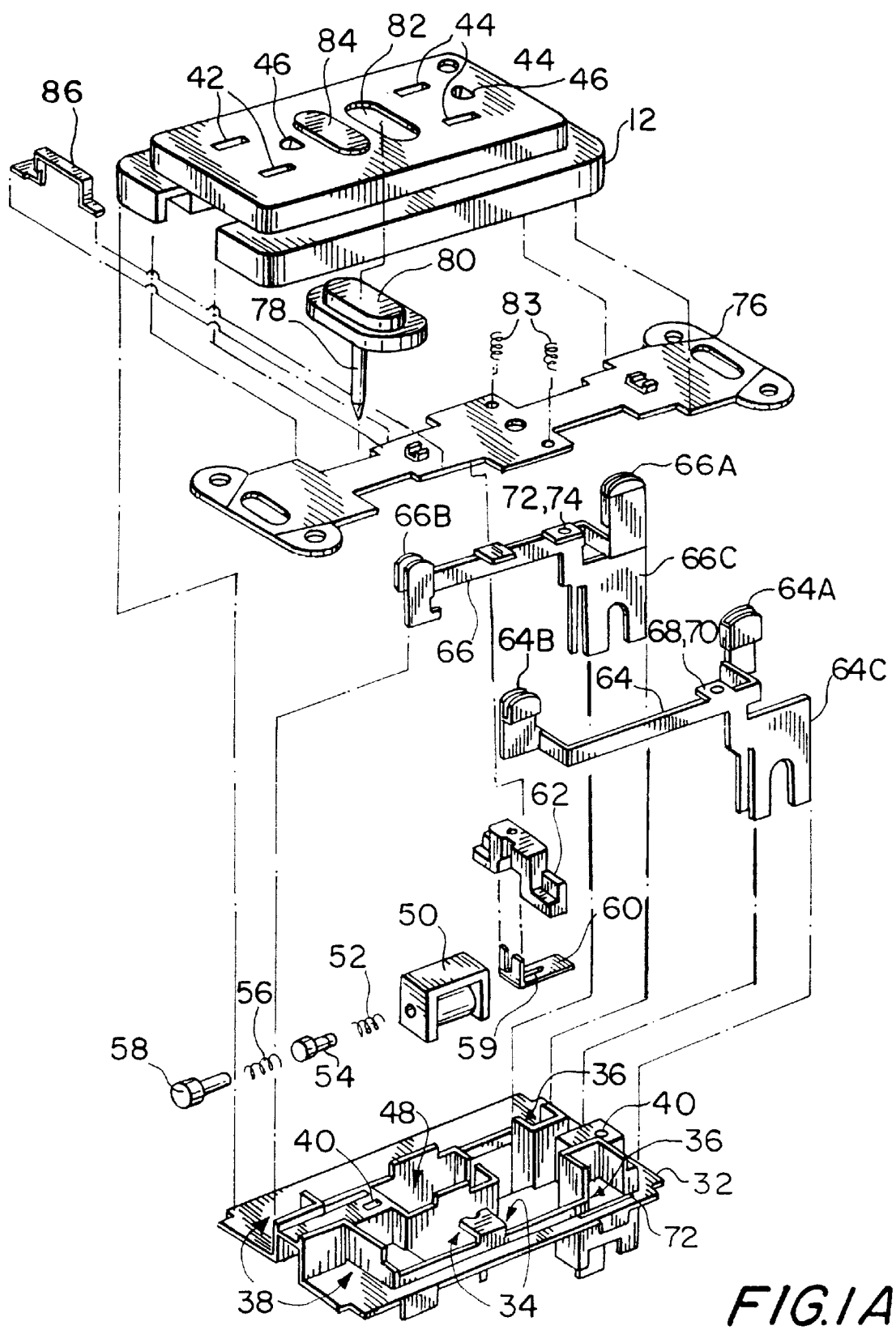
FIGS. 1a–b is an exploded view of a prior art GFCI.
Figure 1B:
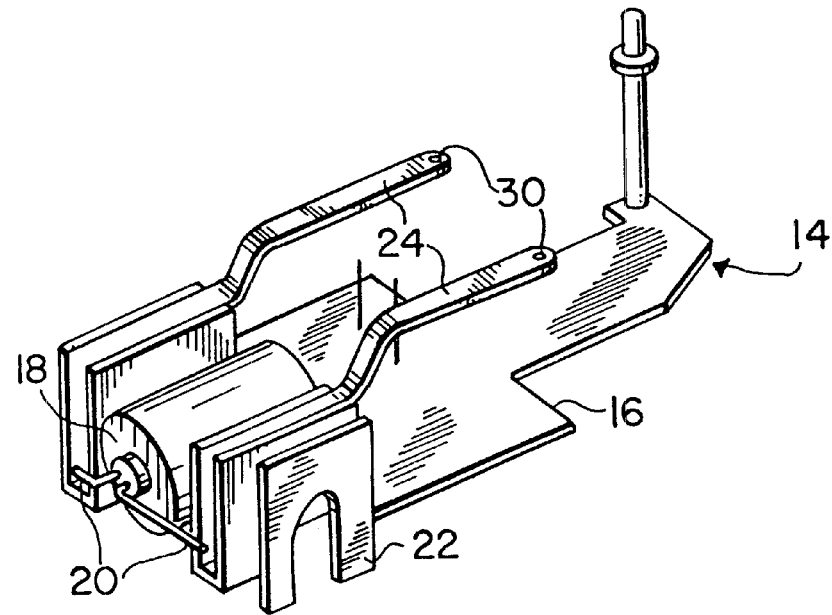
Figure 1B:
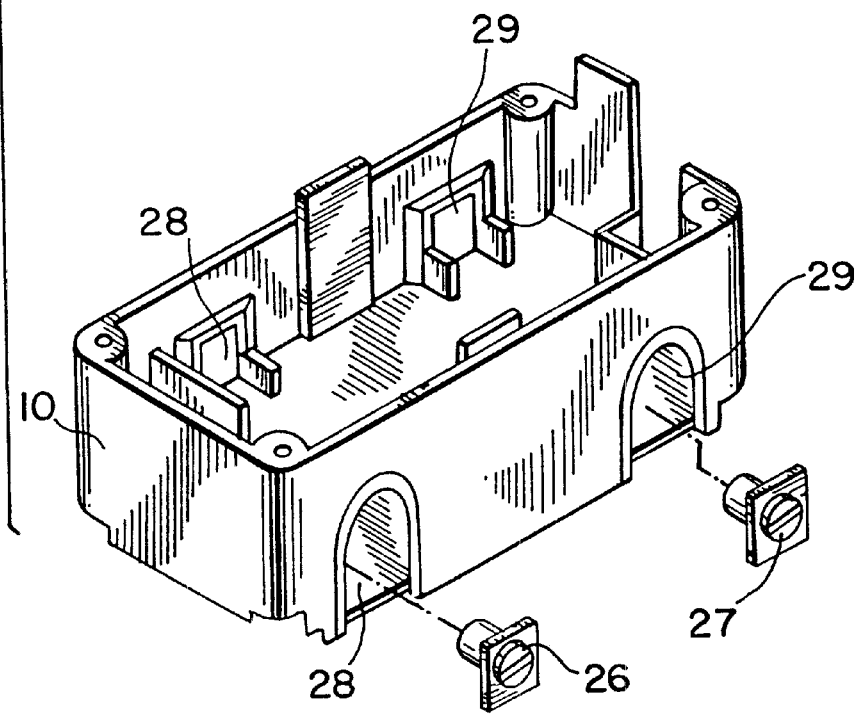
Figure 2A:
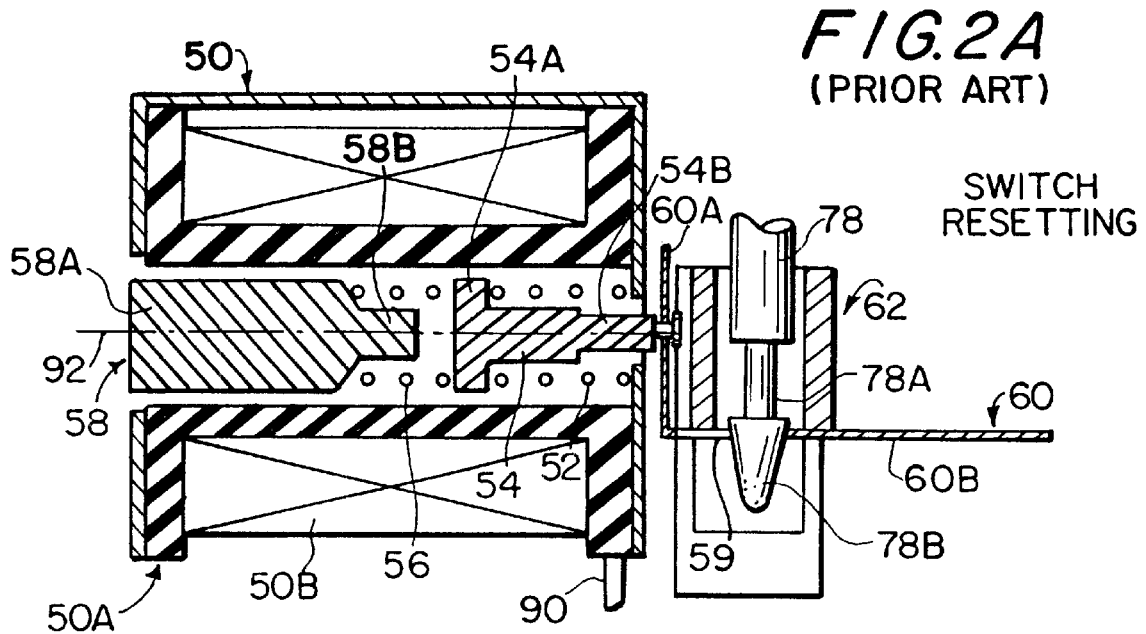
FIGS. 2a–b is a sectional side view of the mechanism of the prior art GFCI of FIGS. 1a–b.
Figure 2B:
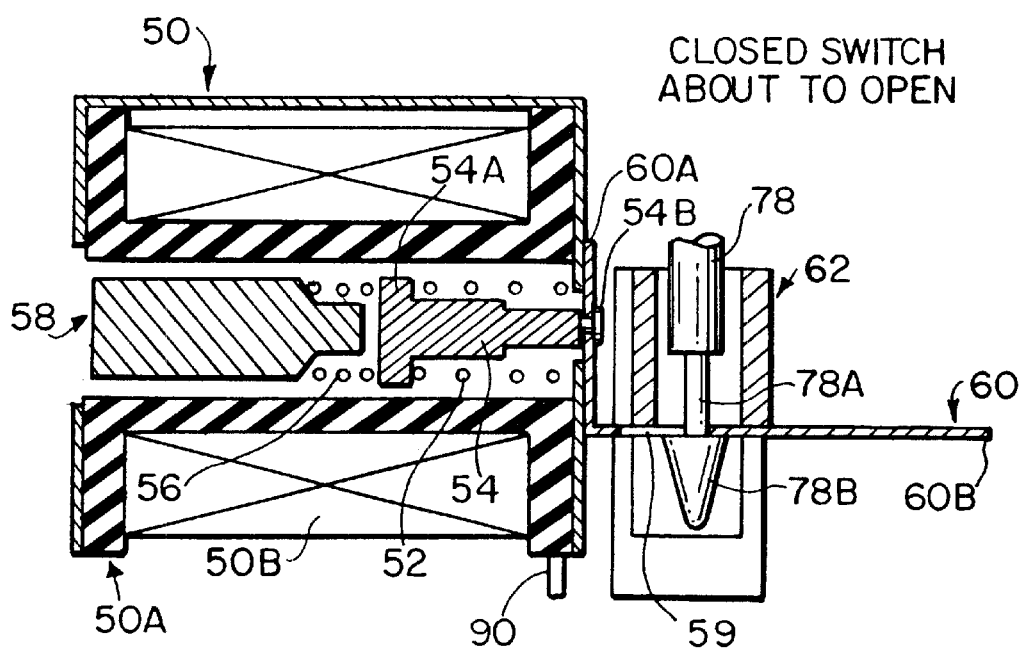
Figure 3:
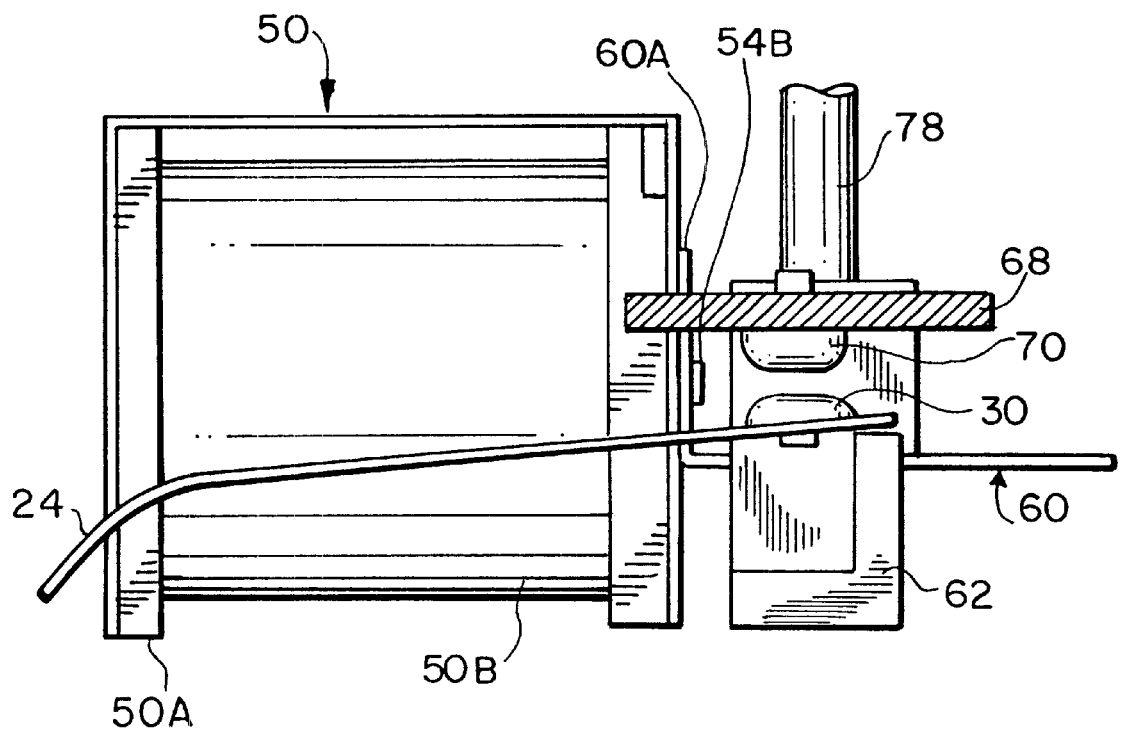
FIG. 3 is a detailed side view of the mechanism of the prior art GFCI shown in FIGS. 2a–b showing the movable contact.

The present application contemplates various types of circuit interrupting devices that are capable of breaking at least one conductive path. The conductive path is typically divided between a line side that connects to supplied electrical power and a load side that connects to one or more loads. As noted, the various devices in the family of resettable circuit interrupting devices include: ground fault circuit interrupters (GFCI's), arc fault circuit interrupters (AFCI's), immersion detection circuit interrupters (IDCI's), appliance leakage circuit interrupters (ALCI's) and equipment leakage circuit interrupters (ELCI's).

For the purpose of the present application, the structure or mechanisms used in the circuit interrupting devices, shown in the drawings and described hereinbelow, are incorporated into a GFCI receptacle suitable for installation in a single-gang junction box used in, for example, a residential electrical wiring system. However, the mechanisms according to the present application can be included in any of the various devices in the family of resettable circuit interrupting devices.

The circuit interrupting and reset portions described herein preferably use electro-mechanical components to break (open) and make (close) one or more conductive paths between the line and load sides of the device. However, electrical components, such as solid state switches and supporting circuitry, may be used to open and close the conductive paths.

Generally, the circuit interrupting portion is used to automatically break electrical continuity in one or more conductive paths (i.e., open the conductive path) between the line and load sides upon the detection of a fault, which in the embodiments described is a ground fault. The reset portion is used to close the open conductive paths.

In the embodiments including a reset lockout, the reset portion is used to disable the reset lockout, in addition to closing the open conductive paths. In this configuration, the operation of the reset and reset lockout portions is in conjunction with the operation of the circuit interrupting portion, so that electrical continuity in open conductive paths cannot be reset if a predetermined condition exists such as the circuit interrupting portion being non-operational, an open neutral condition existing and/or the device being reverse wired.

In the embodiments including an independent trip portion, electrical continuity in one or more conductive paths can be broken independently of the operation of the circuit interrupting portion. Thus, in the event the circuit interrupting portion is not operating properly, the device can still be tripped.

The above-described features can be incorporated in any resettable circuit interrupting device, but for simplicity the descriptions herein are directed to GFCI receptacles.

A circuit interrupting device having any one or more of a reset lockout mechanism, an independent trip mechanism or a separate user load break point may be desirable.

A portion of the mechanism of a prior art GFCI is shown in FIGS. 1a, 1b, 2a, 2b and 3.

The relevant portion of the operation of the prior art GFCI is summarized as follows. When the reset button 80 is pressed down the plunger cone forces the latch 60 to be pressed to the right in FIG. 2a. The latch 60 will come into a position where the hole in the latch 60 is aligned with the plunger 78 such that the conical tip 78b of the plunger 78a will pass through the hole. When the plunger goes all the way through the hole, the sliding latch is biased to go back to the left in FIG. 2b, such that the shoulder of the plunger conical tip comes into contact with the latch 60. When the reset button is released, the plunger 78 is biased upward and the latch 60 is pressed upward causing the device to reset and cause contact 30 to connect to contact 70 in FIG. 3. If the device trips and the solenoid 50 causes the plunger 54 to move latch 60 to the right, the plunger 78 will pass upward through latch 60 and allow the latch, which is biased down to break the contacts.

Figure 4:
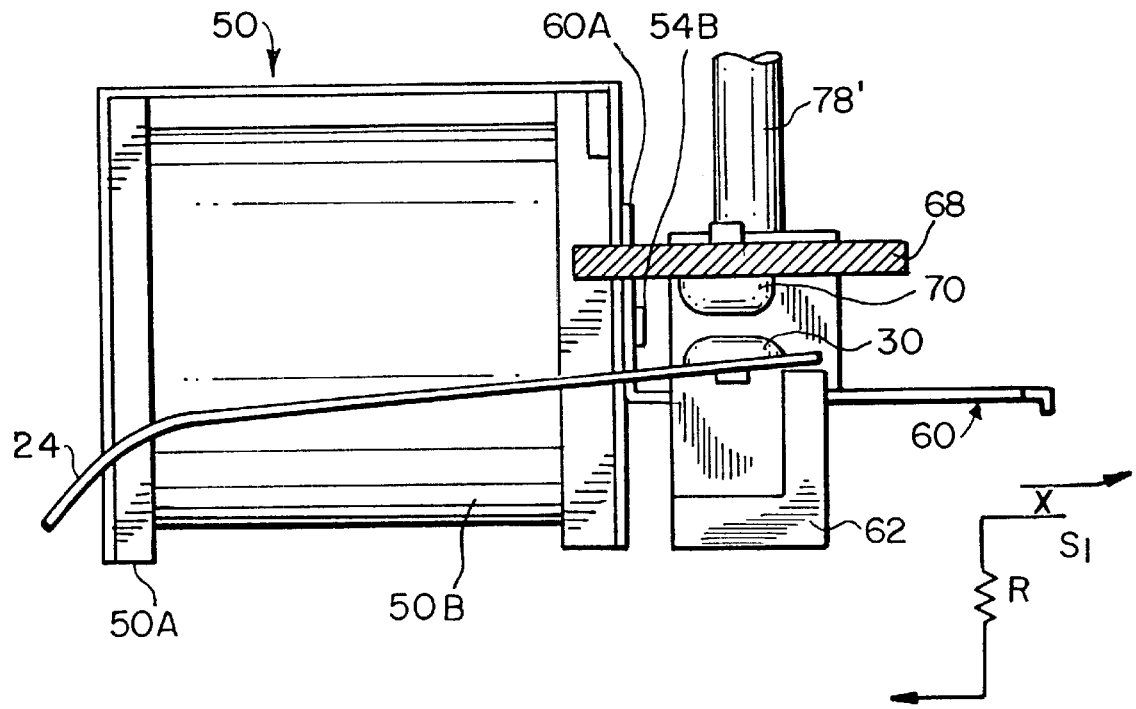
FIG. 4 is a side view of a mechanism of a GFCI according to the present invention.
Figure 5:
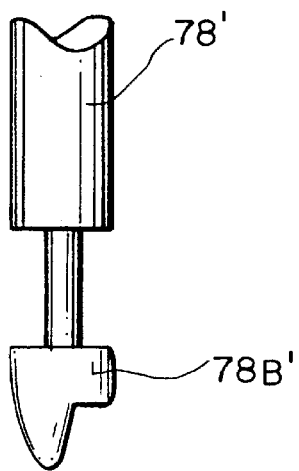
FIG. 5 is a side view of a GFCI plunger according to the present invention.

With reference to FIGS. 4–6, an embodiment of the present invention includes a reset plunger 78' that includes a notched conical tip 78b' that forces latch 60' to act to close switch S1 when the reset plunger 78' is depressed. When switch S1 is depressed, a circuit is closed from the load phase to the line neutral through a current limiting resistor R.

With reference to FIG. 5, the embodiment of the present invention includes a reset plunger 78' that includes a notched conical tip 78b'.

Figure 6A:
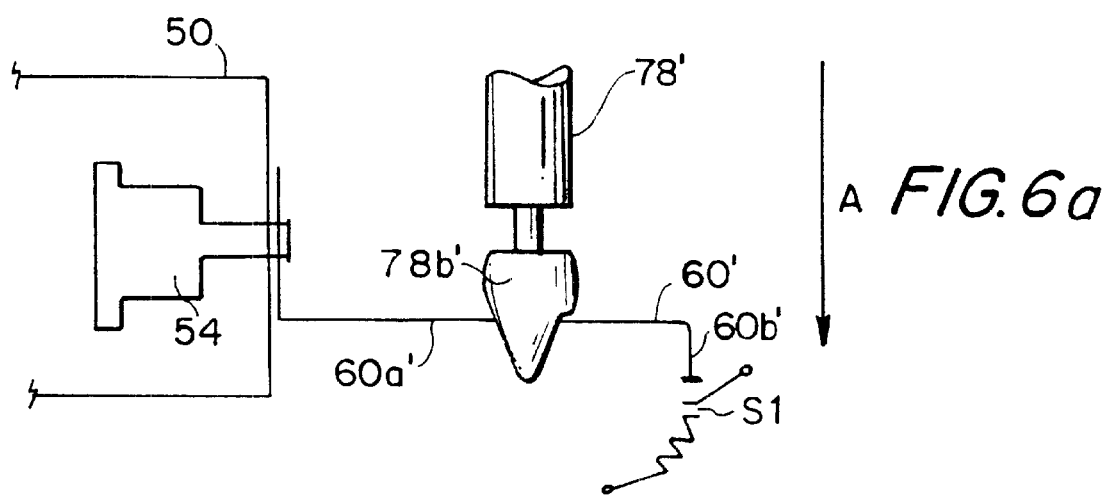
FIGS. 6a–c is a side view of the GFCI mechanism during stages of reset according to the present invention.
Figure 6B:
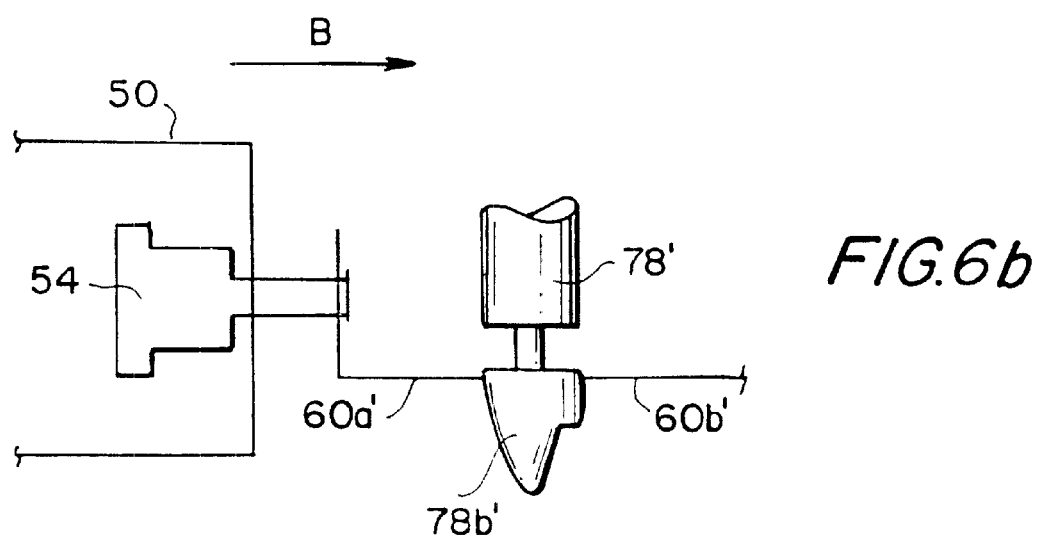
Figure 6C:
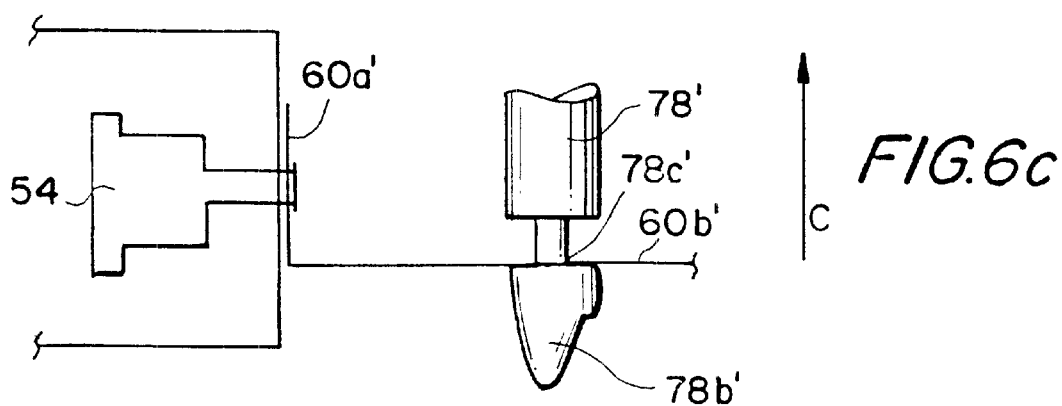

With reference to FIGS. 6a–6c, the reset lockout mechanism of the this embodiment is described. When the reset plunger 78' starts down in direction A, the latch 60' is in its leftmost position. The notched plunger tip 78b' will hit the top of latch 60' and force it down such that switch S1 is closed to engage a test. As shown in FIG. 6b, in this embodiment, the test is accomplished by completing the circuit from the load phase to the line neutral through a current limiting resistor R. If the circuit interrupting device is operational and properly wired as shown by the test, the solenoid forces plunger 54 to slide latch 60' in direction B out from under the notch in 78b' allowing the reset plunger 78' to complete its journey in direction A such that latch 60' will move left and rest atop plunger shoulder 78c' as shown in FIG. 6c. Thereafter, the reset plunger, when released will pull up latch 60' under its bias to complete the reset of the device.

As can be appreciated, if the test fails, the latch 60' will not move in direction B and the notched conical tip 78b' of the reset plunger 78' will keep the plunger from going through the hole in the latch 60' and the device will be locked out from the reset function.

As can be appreciated, a bridge circuit may be implemented to provide reverse wiring protection as described in the pending commonly owned application referenced above. For example, with reference to FIG. 1a of the prior art, a single contact 68,70 is utilized to close a circuit to a load phase terminal 64c and two user load phase terminals 64a and 64b through connector 64. As can be appreciated, terminal 64c could be isolated from connector 64 and arm 24 may utilize a second contact to independently provide a circuit to 64c. Similarly, the modification would be made to both conductive paths of the device. Furthermore an indicator such as a neon bulb may be utilized to indicate a reverse wiring condition.

As can also be appreciated, the device may be manufactured or initialized into a tripped state and distributed in the tripped state such that a user would be required to reset the device before using it.

Figure 7A:
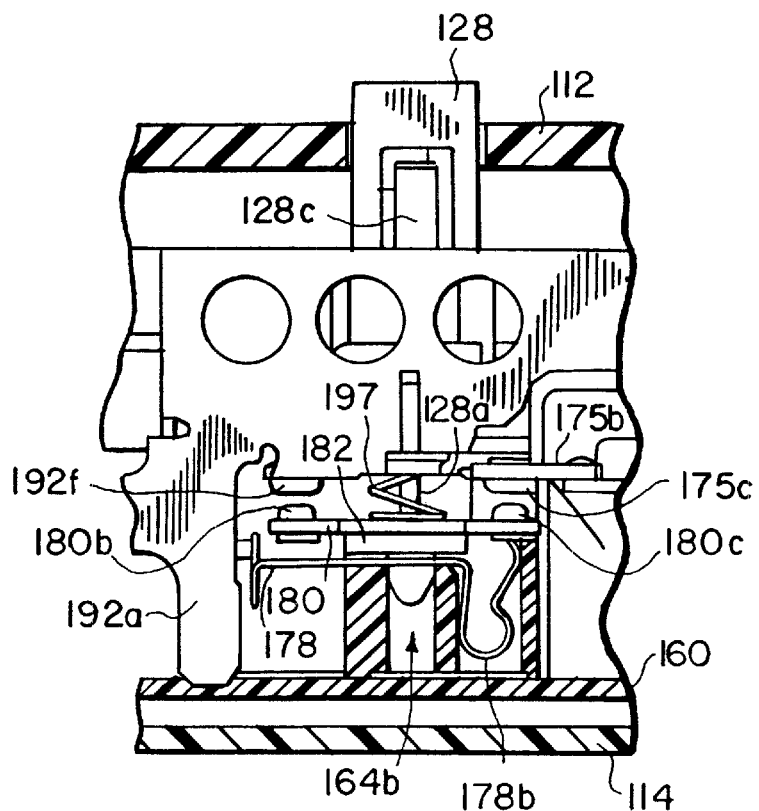
FIGS. 7a–b is a sectional side view of the mechanism of a prior art GFCI.
Figure 7B:
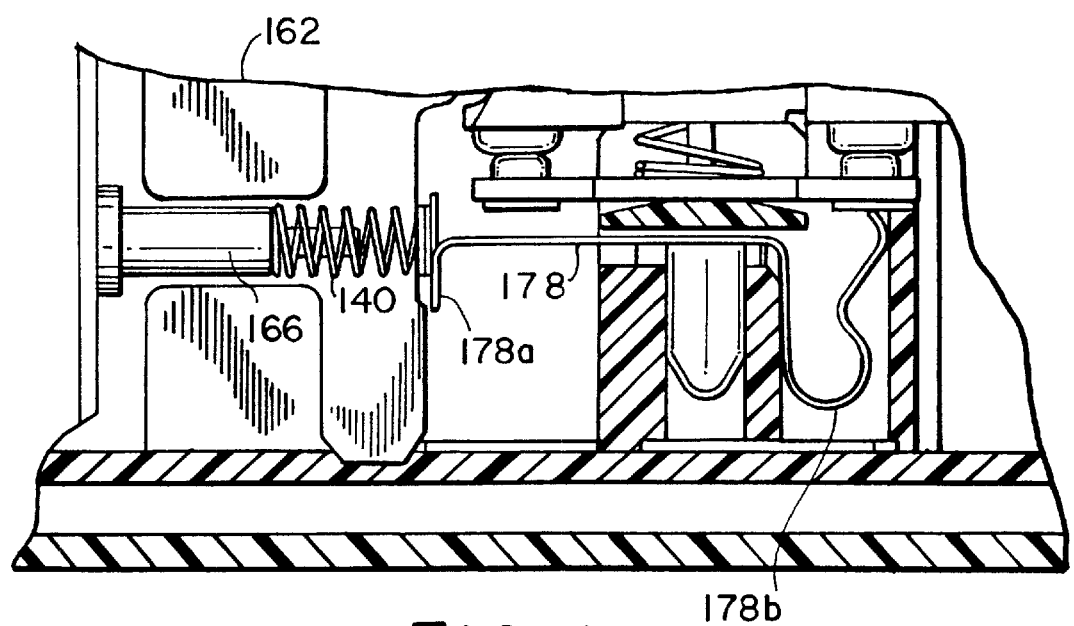
Figure 8:
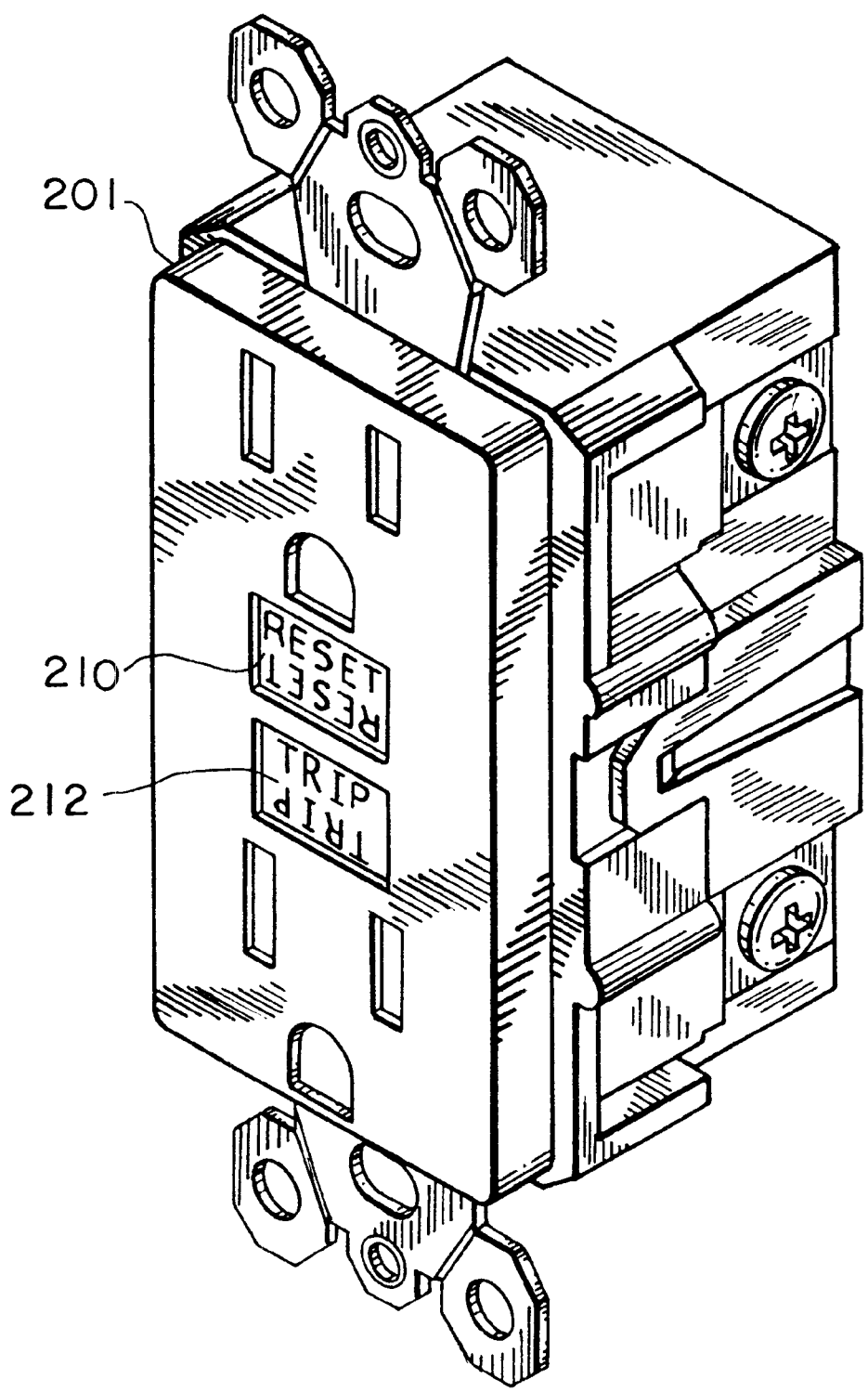
FIG. 8 is a perspective view of one embodiment of a ground fault circuit interrupting device according to the present invention.

A portion of the mechanism of another prior art GFCI is shown in FIGS. 7a, and 7b and is somewhat similar to the previously described prior art unit in some details.

The relevant portion of the operation of the prior art GFCI is summarized as follows. When the reset button 128 is pressed down the lower cone shaped end of the plunger forces a sliding spring latch to the side until the plunger can go through and the latch will spring back to rest on the shoulder of the sliding spring latch and then pull the device into a reset position.

With reference to FIGS. 8–10f, another embodiment of the present invention includes a GFCI 201 having a rest button 210 and trip button 212.

Figure 9:
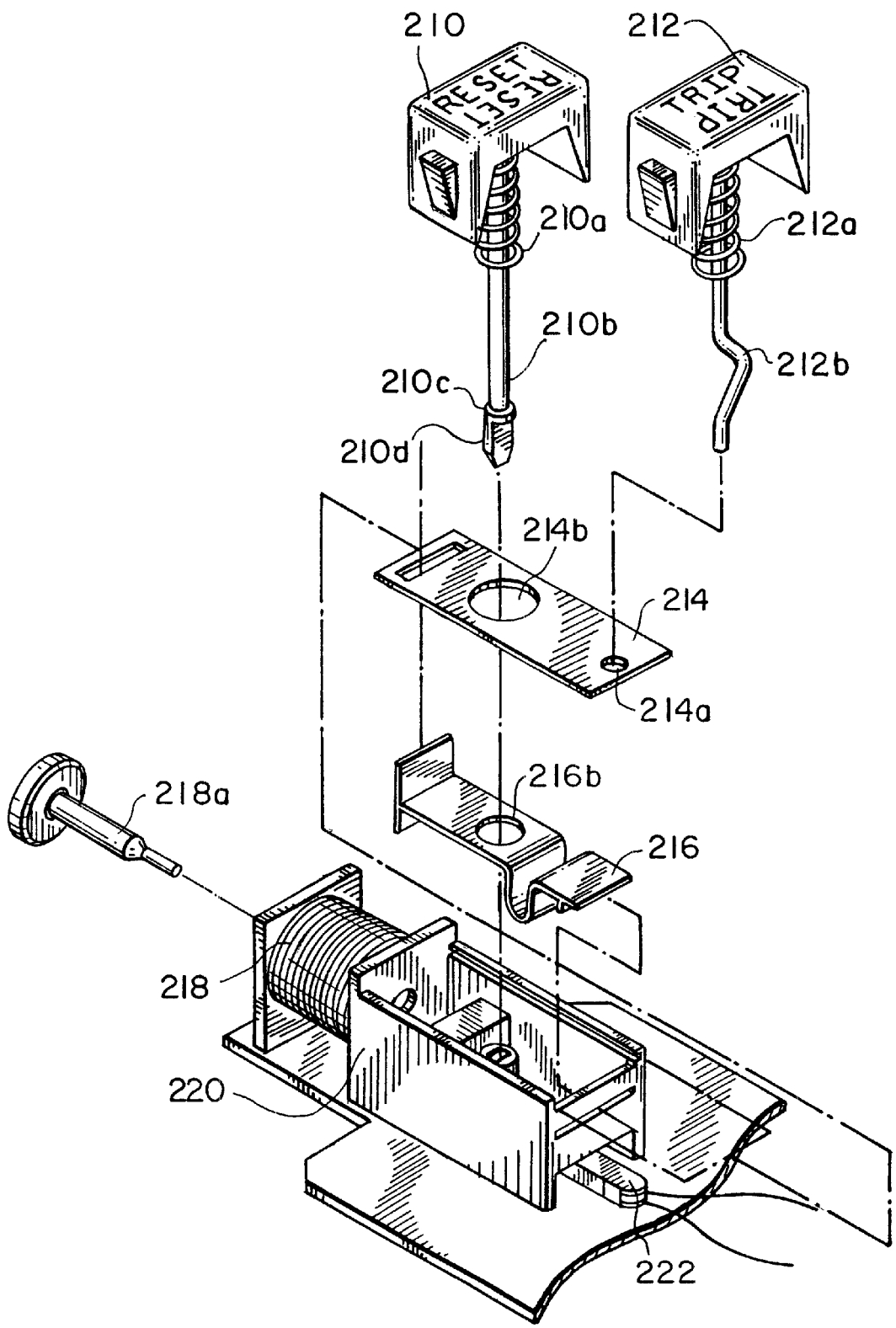
FIG. 9 is an exploded view of a portion of a GFCI according to the present invention.

With reference to FIG. 9, the reset button 210 has a bias spring 210a, a shaft 210b, a conical tip with step 210d and the conical tip has a shoulder 210c. The trip button 212 has a bias spring 212a, and a formed wire shaft 212b. A sliding plate 214 and sliding spring 216 fit into grooves of housing 220 that is mated to solenoid 218 and solenoid plunger 218a. Switch 222 is mounted in the housing under the sliding spring 216.

Figure 10A:
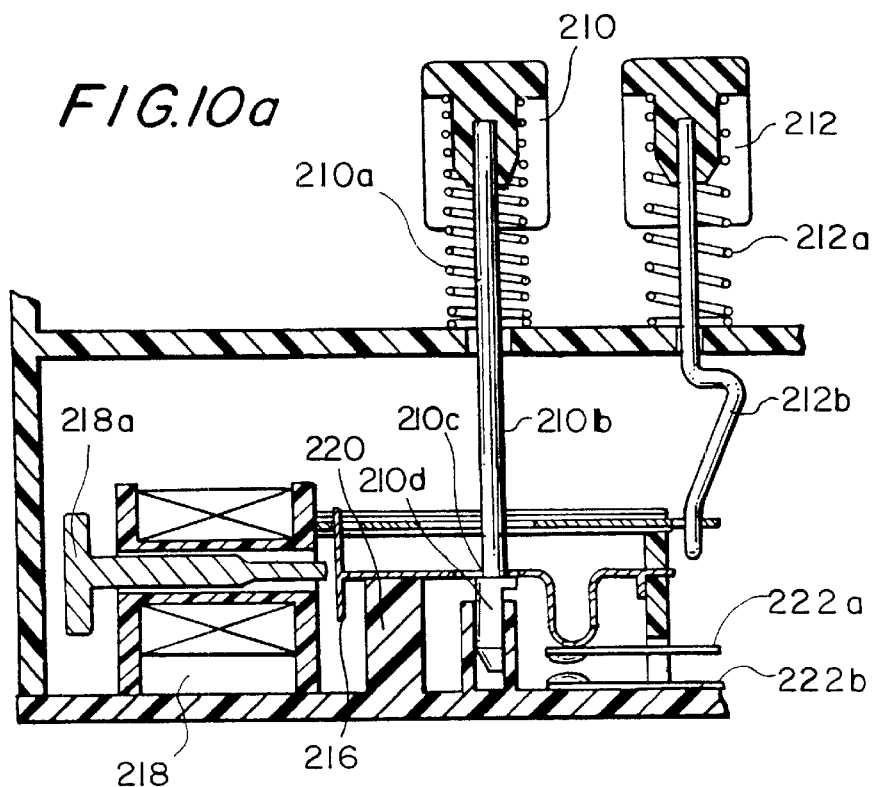

With reference to FIGS. 10a–f, the operation of the relevant portion of the device is described. FIG. 10a shows the device as in normal operation with current allowed to pass through.

Figure 10B:
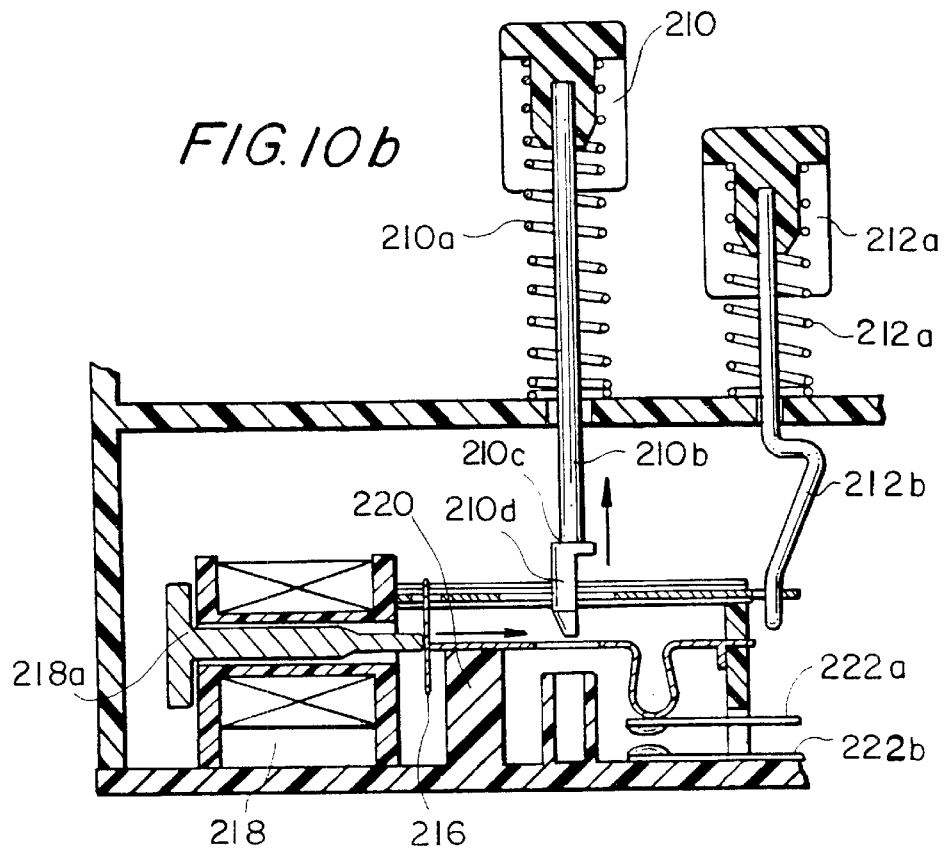

FIG. 10b shows the operation when tripped. Solenoid 218 pulls plunger 218a and pushes sliding spring 216 and sliding plate 214 to the right such that sliding spring 216 no longer holds down reset plunger shoulder 210c and the spring bias of spring 210a forces plunger 210b upward and the circuit is broken (not shown).

FIG. 10c shows the reset lockout mechanism in use. After the tripped state, when the reset button 210 is depressed, the step in conical tip 210d presses down on sliding spring 216 and forces switch 222 to close. This view is prior to the solenoid actuation.

FIG. 10d shows the test being completed successfully. The switch 222 closes the test circuit that causes solenoid 218 to fire and the plunger forces sliding spring 216 and sliding plate 214 to the right, allowing the plunger to continue to travel downward once the plunger tip step 218d clears the hole in the sliding spring 216b.

Figure 10E:
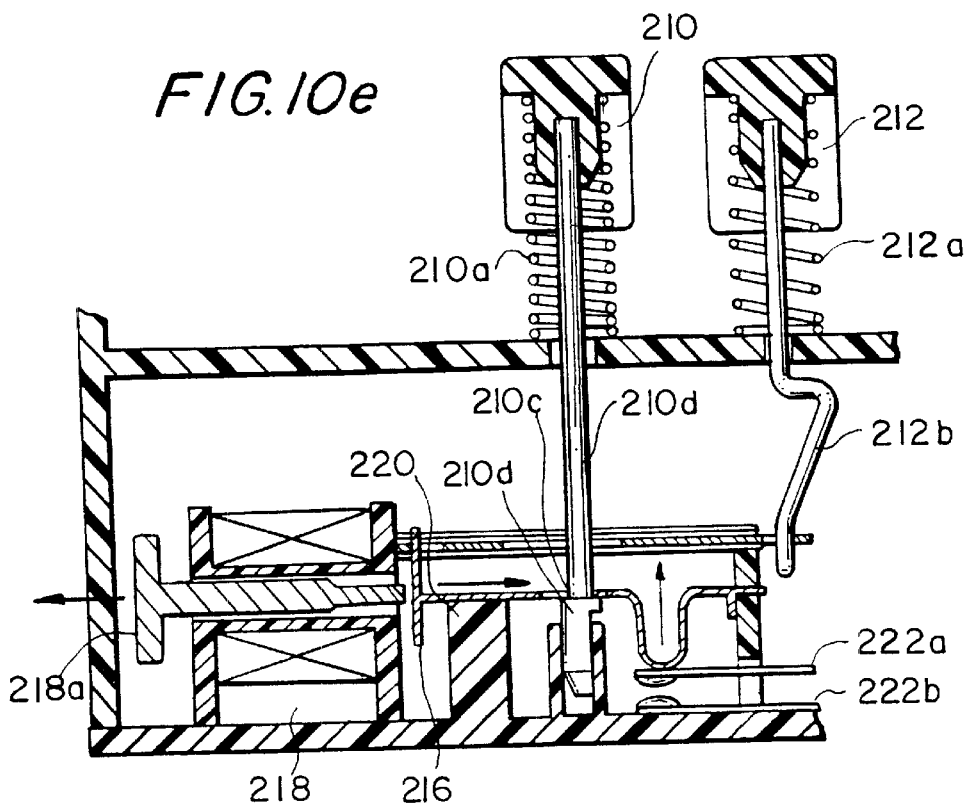

FIG. 10e shows the device after the test is completed. The plunger tip 210d clears the hole 216b and the sliding spring releases upward and test switch 222 opens ending the test cycle. The solenoid 218 releases plunger 218' and sliding spring 216 and sliding plate 214 return to the left. The sliding spring 216 then rests on top of the plunger tip shoulder 210d and the spring 210a pulls the spring up to reset the device.

Figure 10F:
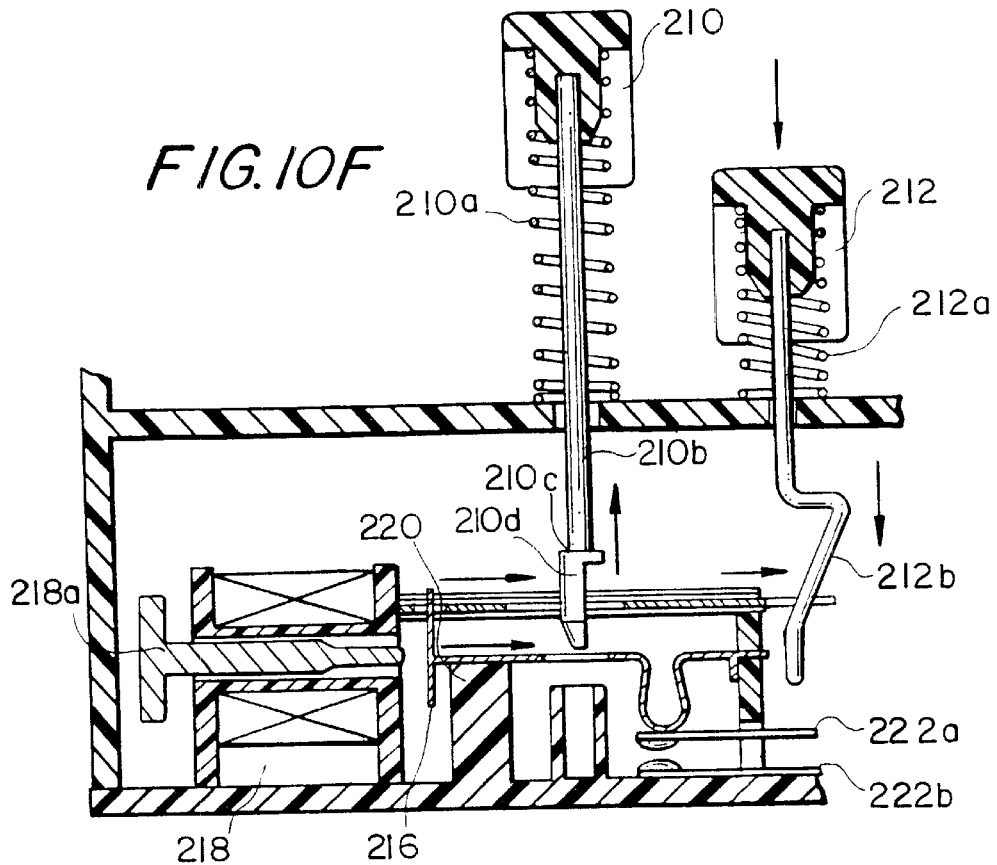

FIG. 10f shows the independent trip mechanism of the device 201. The independent trip will trip the device without using the sense mechanism or the solenoid. It is preferably a mechanical device, but can be implemented with electronic or electro-mechanical components. As trip button 212 is pressed downward, formed wire 212b moves downward and the sloped shape interacts with hole 214a of sliding plate 214 to force the sliding plate and sliding spring to the right such that hole 216b moves enough to allow reset plunger 210b to release upward and trip the device. Accordingly, the sliding plate 214 is utilized to move the sliding spring 216 into alignment. The sliding plate 214 may be held in place by the middle and bobbin housings. The formed wire 212b causes a cam action and moves the sliding plate 214, causing the device to trip.

As can be appreciated, the mechanical trip described will function to trip the device even if the solenoid or other parts are not functioning.

As can be appreciated from the discussion above, a bridge circuit may be implemented to provide reverse wiring protection as described in the pending commonly owned application referenced above. Furthermore an indicator such as a neon bulb may be utilized to indicate a reverse wiring condition. As can also be appreciated, the device may be manufactured or initialized into a tripped state and distributed in the tripped state such that a user would be required to reset the device before using it.

Figure 11:
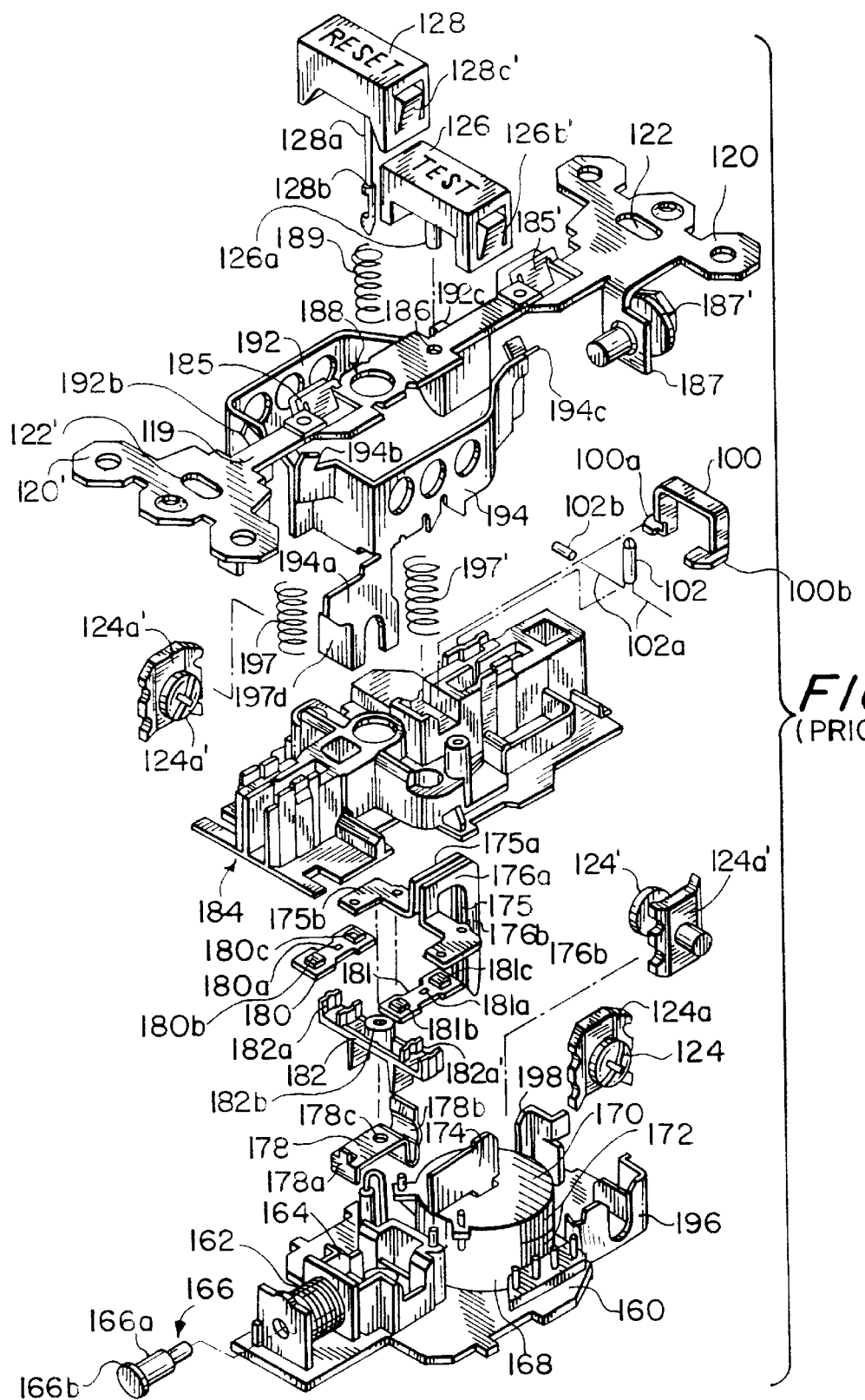
FIG. 11 is an exploded view of a prior art GFCI as shown in FIGS. 7a–b.
Figure 12:
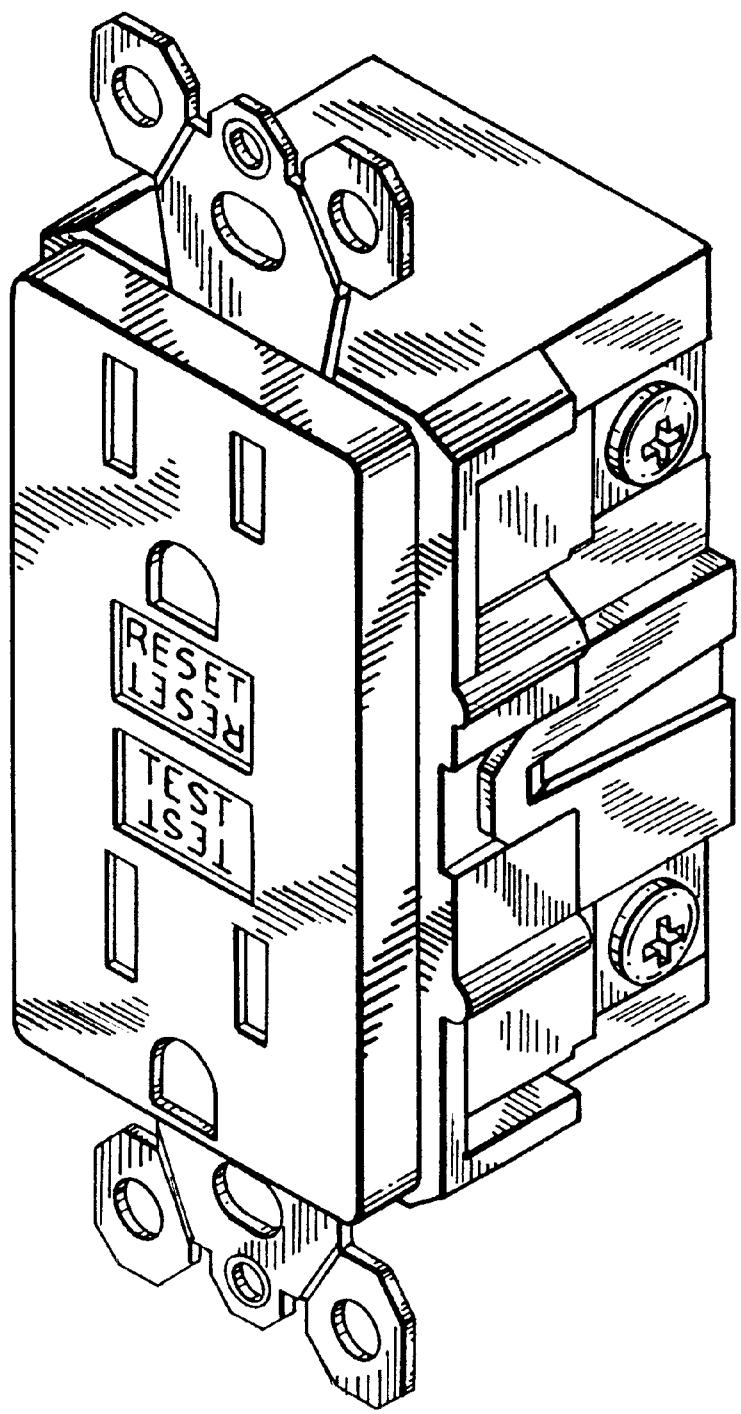
FIG. 12 is a perspective view of one embodiment of a ground fault circuit interrupting device according to the present invention.

FIG. 11 shows a representative prior art GFCI without a reset lockout mechanism or independent trip.

FIGS. 12 and 13a–13f show modifications to parts of the representative GFCI to facilitate a reset lockout and independent mechanical trip according to another embodiment of the invention.

The primary purpose of the Reset Lockout and Mechanical Trip is to lockout the resetting of a GFCI Type device unless the device is functional, as demonstrated by the built in test, at the time of reset. The Mechanical Trip is a part of this test cycle by insuring that the device is in the tripped state even if the device is unpowered or non-operational. The means and electronics by which this device trips upon ground fault conditions are not modified. These same means and electronics are now employed as a condition of reset. The test function is incorporated in the reset function, therefore no separate test is required and the test button is employed for a mechanical reset.

As shown in FIGS. 13a–f, the reset plunger 328 was changed from a semi cone (to lead into the shuttle), to a reverse taper. The diameter of the top edge (the area that latches the contacts closed) remains unchanged so that the holding power and release effort remains unchanged from the original design. The lower end has the taper removed and the diameter increased so that it will not pass through the shuttle unless the shuttle is positioned in the release position by the activation of the solenoid. The shaft notch 328a is insulated and the bottom 328b is conductive.

Additionally, the contact carrier 380 has a contact added 382 so that when the plunger is in the tripped position, the plunger is connected to the phase line, after the point at which it passes through the sense transformer. Additionally, the shuttle 378 is wired to the circuit board at the point of the original test contact.

In a further embodiment, another test switch may be used. Pushing the Test button 326 mechanically trips the plunger by moving the shuttle in the same direction as would the solenoid. This is independent of power or functionality of the unit.

While the large end of the plunger is within the contact carrier, it is connected to the phase line. When the reset button is pressed, the plunger pushes against the shuttle, but does not pass through. The shuttle is the other terminal of the test contact and contacting it with the live plunger initiates the test cycle. If the test is successful, the firing of the solenoid (exactly the same as on the trip cycle) opens the port for the plunger to pass through to the armed position. This causes the large end of the plunger to pass completely through the contact carrier, removing the phase line contact from the plunger, ending the test cycle. Upon release of the reset button, the return spring lifts the shuttle, raising the contact carrier to establish output exactly as before the modification.

In order for the above design to function a momentary operation of the latch solenoid must operate. If this operation is activated via the test circuit their reset of the device also tests the device eliminating the need for the test button to perform an electrical trip. This leaves the test button available to be converted to a mechanical trip mechanism.

The reset mechanism could have electrical contacts added such that the base of the plunger (latch) makes contact in the side wall of the guide hole located on the contact carrier of the device. This side wall contact would be connected using a small gauge very flexible conductor to the existing test contact (molded in the solenoid housing or on the PC board). A second connection would be required from the phase load conductor after the point at which it passes through the sense coils to the latch mechanism (the part that is acted on by the solenoid.)

The reset button is depressed. The plunger on the lower end of the reset button is in electrical contact with its guide hole which in run is wired to the electrical test circuit. When the bottom end of the plunger contacts the latch (which is in electrical contact with phase line) if the device is powered and if the test circuit is functional, the solenoid moves the latch to the open position and the plunger passes through to the opposite side. As the plunger is no longer in electrical contact with the side wall of the guide, the solenoid releases the latch to return to its test position. Releasing the reset button pulls the latch up as in the original design.

A mechanical test mechanism may be fashioned by removing and discarding the test electrical contact clip (switch) of FIG. 11.

Figure 13A:
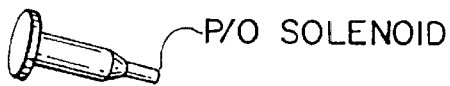
FIG. 13a is a perspective view of a solenoid plunger of a GFCI according to another embodiment of the present invention according to FIG. 12 as modified from plunger 166 of FIG. 11.
Figure 13B:
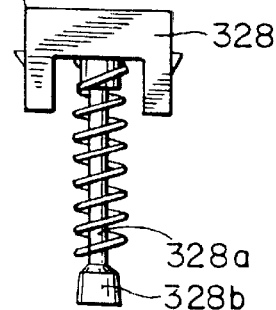
FIG. 13b is a perspective view of a reset button/lift plunger/test contact of a GFCI according to the embodiment of the present invention according to FIG. 12 as modified from 128 of FIG. 11.
Figure 13C:
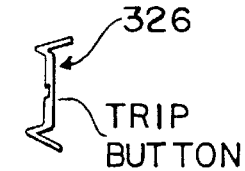
FIG. 13c is a perspective view of a trip button of a GFCI according to the embodiment of the present invention according to FIG. 12 as modified from 126 of FIG. 11.
Figure 13D:
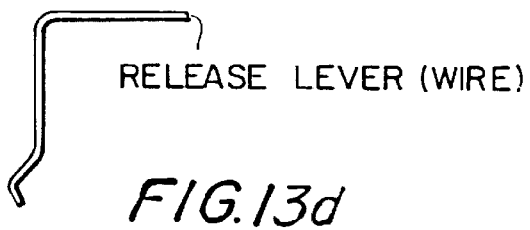
FIG. 13d is a perspective view of a release lever wire of a GFCI according to the embodiment of the present invention according to FIG. 12.
Figure 13E:
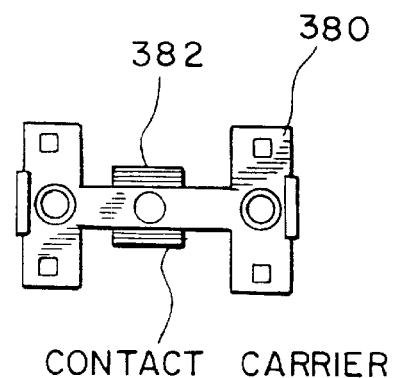
FIG. 13e is a perspective view of a contact carrier with switch attached of a GFCI according to the embodiment of the present invention according to FIG. 12 as modified from 180–182 of FIG. 11.
Figure 13G:
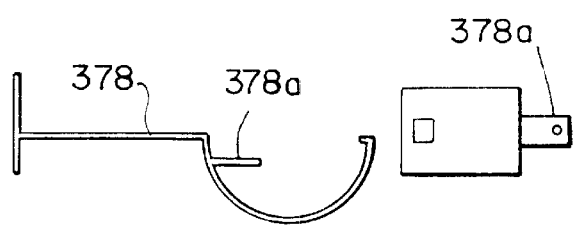
FIG. 13g is a side and partial top view of the latch of a GFCI according to another embodiment of the present invention that is similar to FIG. 12 as modified from 178 of FIG. 11.
Figure 13F:
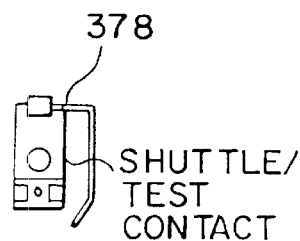
FIG. 13f is a perspective view of a shuttle/test contact of a GFCI according to the embodiment of the present invention according to FIG. 12 as modified from 178 of FIG. 11.

As shown in FIG. 13g, a tab with a hole may be added to the part of the latch that is operated by the solenoid in the area of the spring end 378a. Corresponding holes and mechanism may be added to the test button such that depressing the test button pushes a lever into the hole in the latch that would cause it to move in a manner similar to activation of the solenoid, causing the latch plunger to release on in a normal trip mode.

The latch (shuttle) is modified to have the "plunger operating hole" size reduced to prevent the plunger from being forced through when the latch is not in the release position.

Another embodiment is described with reference to FIGS. 14–16. FIGS. 14a–c show a prior art GFCI 400 in various stages of operation as described.

Figures 14A, 14B, 14C:
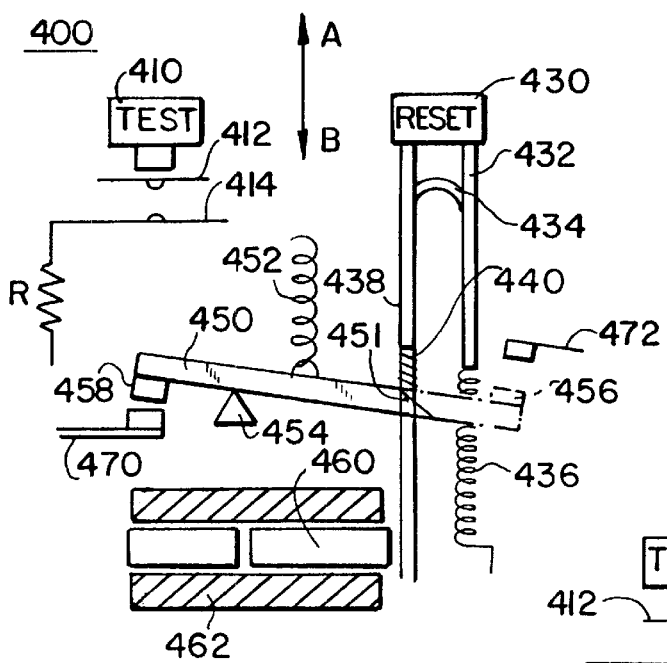
FIGS. 14a–c is a cutaway representation of part of a prior art GFCI.

Referring to FIG. 14a, when the reset button 430 is pressed down in direction B, a raised edge 440 on the reset arm 438 slides down to an angled portion 451 of a lifter 450 as shown in FIG. 14c (but shown during a trip). As shown in FIGS. 14b and c, the spring 434 on the reset arm 438 allows it to move in direction D as it slides past the notch 451 in the lifter 450. When the raised edge 440 of the reset arm 438 clears the lifter 450, the reset arm moves back in direction C to a vertical position under the bias of spring 434. The shoulder of the raised edge 440 then becomes engaged with the bottom of lifter 450 because the reset arm is under bias upward of reset spring 436. The device is now reset as shown in FIG. 14b with contact 458 engaging 470 and contact 456 engaging contact 472. The lifter 450 is biased down on spring 452 on the right side of pivot 454 and the reset mechanism is biased upward by spring 436. Accordingly, as shown in FIG. 14c, when the solenoid 462 fires because of a trip or test, the reset bar 438 is moved in the D direction by plunger 460 until the raised edge 440 clears the lifter notch 451 and the bias spring 452 forces the circuits open by pushing the lifter 450 down on the right side of pivot 454.

Another embodiment of a GFCI 500 of the present invention is shown with reference to FIGS. 15–16b, and in relation to FIGS. 14a–c. As shown in the prior art FIG. 16a, there is an angled portion of the lifter 451 that is removed as shown in FIG. 16b to create lifter edge 551. Accordingly, as shown in FIG. 15, the solenoid 562 must fire and move the reset arm 538 past the lifter 550 and edge 551. If the solenoid does not fire, the reset arm will not be able to pass the lifter as in the prior art device because the angled lifter notch 451 is removed.

Another arm 582 is attached to the reset button which makes contact with contact 584 when reset button 530 is pressed down in the B direction. The test circuit (not shown) is then completed using current limiting resistor R. this will fire the solenoid 562 and move the reset arm 538 past the lifter 550 allowing the device to reset. If the solenoid 562 fails to fire for some reason, the device will be locked out and a reset not possible.

In another embodiment, an independent trip mechanism is provided as a mechanical trip feature based upon the test button 510. When test button 510 is depressed in the B direction, angled test bar 516 cams angled trip bar 580 in the D direction. This will push the reset bar 538 and release the reset button to trip the device (not shown). As can be appreciated, FIG. 15 shows the device already tripped. Because allowing the manual trip would not be useful, ribs (not shown) are placed to ensure that the test button may only be depressed when the reset button is down and the device is powered.

Accordingly, the device 500 may be tripped even if the solenoid 562 is not able to fire.

As noted, although the components used during circuit interrupting and device reset operations are electro-mechanical in nature, the present application also contemplates using electrical components, such as solid state switches and supporting circuitry, as well as other types of components capable or making and breaking electrical continuity in the conductive path.

While there have been shown and described and pointed out the fundamental features of the invention, it will be understood that various omissions and substitutions and changes of the form and details of the device described and illustrated and in its operation may be made by those skilled in the art, without departing from the spirit of the invention.

What is claimed:

1. A circuit interrupting device comprising:

a housing;

a phase conductive path disposed at least partially within said housing between a line side and a load side, said phase conductive path terminating at a first connection capable of being electrically connected to a source of electricity, a second connection capable of conducting electricity to at least one load;

a circuit interrupting portion disposed within said housing and configured to cause electrical discontinuity in said phase conductive path between said line side and said load side upon the occurrence of a predetermined condition; and a reset portion disposed at least partially within said housing and configured to reestablish electrical continuity in said phase conductive path, wherein said reset portion further comprises a reset lockout portion having a spring biased reset member with protrusion for interfering with a lever latch and a test switch portion to cause a test that clears the interference if successful in order to prevent reestablishing electrical continuity in said phase and neutral conductive paths if said circuit interrupting portion is non-operational, if an open neutral condition exists or if a reverse wiring condition exists.

\* \* \* \* \*

UNITED STATES PATENT AND TRADEMARK OFFICE
CERTIFICATE OF CORRECTION

PATENT NO.    : 6,671,145 B2
DATED         : December 30, 2003
INVENTOR(S)   : Frantz Germain et al.

It is certified that error appears in the above-identified patent and that said Letters Patent is hereby corrected as shown below:

<u>Title page</u>,
Item [75], Inventors, replace "Nichalas L. Disalvo" with -- Nicholas L. DiSalvo --

Signed and Sealed this

Twenty-fifth Day of May, 2004

JON W. DUDAS
*Acting Director of the United States Patent and Trademark Office*